United States Patent [19]
Forloni et al.

[11] Patent Number: 5,466,498
[45] Date of Patent: Nov. 14, 1995

[54] PASTEURIZABLE, COOK-IN MULTILAYER SHRINK FILM

[75] Inventors: Roberto Forloni, Nerviano; Mario Paleari, Pogliano, both of Italy

[73] Assignee: W. R. Grace & Co.-Conn., Duncan, S.C.

[21] Appl. No.: 140,342

[22] Filed: Oct. 21, 1993

[51] Int. Cl.$^6$ .................................................. B29D 22/00
[52] U.S. Cl. ...................... 428/36.7; 428/35.7; 428/516; 428/517; 428/910
[58] Field of Search ...................... 428/910, 516, 428/517, 35.7, 36.7

[56] References Cited

U.S. PATENT DOCUMENTS

| | | |
|---|---|---|
| 3,595,740 | 7/1971 | Gerow . |
| 3,741,253 | 6/1973 | Brax et al. . |
| 4,064,296 | 12/1977 | Bornstein et al. . |
| 4,352,702 | 10/1982 | Bornstein . |
| 4,411,919 | 10/1983 | Thompson . |
| 4,469,742 | 9/1984 | Oberle et al. . |
| 4,606,922 | 8/1986 | Schirmer . |
| 4,855,183 | 8/1989 | Oberle . |
| 4,888,223 | 12/1989 | Sugimoto et al. . |
| 5,223,311 | 6/1993 | Tsutsumi et al. .................. 428/461 |

FOREIGN PATENT DOCUMENTS 2009033B  8/1982  United Kingdom .

Primary Examiner—Edith Buffalow
Attorney, Agent, or Firm—William D. Lee, Jr.; Mark B. Quatt; Rupert B. Hurley, Jr.

[57] ABSTRACT

A pasteurizable and/or cook-in multilayer shrink film, which is characterized in that the innermost sealing layer comprises an ethylene-butyl acrylate-maleic anhydride copolymer.

19 Claims, No Drawings

PASTEURIZABLE, COOK-IN MULTILAYER SHRINK FILM

BACKGROUND OF THE INVENTION

This invention relates generally to heat shrinkable, relatively gas impermeable, thermoplastic packaging film which can be heat sealed to itself to form a flexible package. The invention relates more particularly to a pasteurizable and/or cook-in multilayer shrink film preferably comprising an outer layer, at least one barrier layer, at least one shrink layer and an innermost sealing layer which can be used for the manufacture of bags for food products in which the packaged product is thermally treated for a certain period for pasteurizing or cooking, the multilayer structure, being shrinkable and resistant to such conditions.

There is a need in the food packaging industry for a packaging film from which bags can be made which are of improved structural soundness such that they may be fully characterized as pasteurizable and/or cook-in. Further, it is desirable to have a precooked food product which is attractively packaged inside the film within which it was precooked.

The term "pasteurizable" as used herein is intended to refer to packaging material structurally capable of withstanding exposure to pasteurizing conditions while containing a food product. It is common practice in the food industry to apply a pasteurization process to certain food products after packaging, In order to reduce the bacterial load of such products, thereby improving product freshness and extending the shelf life. Specific pasteurization requirements tend to vary by country: however, limiting conditions probably are submersion of the hermetically sealed product in water at 98° C. for 1 hour. Thus, for a bag to be characterized as pasteurizable, structural integrity of the bag must be maintained during pasteurization, i.e. the bag must have superior high temperature seal strength and must be delamination resistant under such time-temperature conditions. Additionally, the packaging material should be heat shrinkable under pasteurizing conditions so as to provide an attractively packaged pasteurized food product.

The term "cook-in" as used herein is intended to refer to packaging material structurally capable of withstanding exposure to cook-in time-temperature conditions while containing a food product. Cook-in packaged foods are essentially pre-packaged, pre-cooked foods that go directly to the consumer in that configuration which may be consumed with or without re-heating. Cook-in time-temperature conditions typically refer to a long slow cooking process, for example submersion in water at up to 90° C. for several hours. Such cook-in time-temperature requirements are representative of institutional cooking requirements. Submersion at 80° C. for 12 hours or 90° C. for 8 hours probably represent limiting cases. Under such conditions, a packaging material properly characterized as cook-in will maintain seal integrity and will be delamination resistant. Additionally, the packaging film should be heat shrinkable under these conditions so as to form a tightly fitting package and preferably should have some tendency for product adhesion to prevent "cook-out" or collection of juices between the surface of the food product and the interior surface of the packaging material.

Generalizing, there are a number of requirements for a pasteurizable, cook-in packaging material. It is the purpose of the present invention to provide a pasteurizable, cook-in packaging film meeting all of these requirements. First, bags made from such film must have seal integrity under such conditions, i.e. the heat sealed seams should resist being pulled apart during heat shrinking. As a corollary, the film should be heat sealable to itself. Second, such bags must be delamination resistant, i.e. the multilayers making up the film must not separate or blister. Third, the food contact layer of such film must qualify under the appropriate food laws and regulations for safe food contact. Fourth, the film must provide an oxygen and vapor barrier, i.e. must possess a low permeability to maintain the freshness of the food contained therein. Fifth, the film must be heat shrinkable in hot water under these time-temperature conditions, i.e. the film must possess sufficient shrink energy such that upon the packaged food product being submerged in hot water the packaging film will shrink snugly around the product contained therein, representatively about 30–50% biaxial shrinkage at about 90° C. Sixth, the film should possess optical clarity, i.e. the film should not become cloudy upon exposure to these time-temperature conditions so as to maintain eye appeal of the packaged product. Seventh, if used for cooking the film should have food product adherence to restrict "cook-out" or collection of juices between the surface of the contained food product and the food contact surface of the packaging material during cook-in, thereby increasing product yield.

In general, such a multilayer film structure will have the minimal structure (sealing and food contact layer)/(shrink layer)/(barrier layer)/(abuse layer), a composite structure being required to achieve the desired composite properties of the packaging film.

A heat shrinkable, thermoplastic, barrier packaging film for making bags which has enjoyed considerable commercial success is described in U.S. Pat. No. 3,741,253 (issued on Jun. 26, 1973 to Brax et al.), which relates to a multilayer film comprising a sealing layer of an irradiated ethylene-vinyl acetate copolymer, a core layer of vinylidene chloride copolymer, and a second outside layer of an ethylene-vinyl acetate copolymer. In manufacturing this type of heat shrinkable film, a tubular orientation process is utilized wherein a primary tube of the film is biaxially oriented by stretching with internal pressure in the transverse direction and with the use of pinch rolls at different speeds in the machine direction. Then the bubble is collapsed, and the film is wound up as flattened, seamless, tubular film to be used later to make bags, e.g. either end-seal bags typically made by transversely heat sealing across the width of flattened tubing followed by severing the tubing so that the transverse seal forms the bottom of a bag, or side-seal bags in which, the transverse seals form the bag sides and one edge of the tubing forms the bag bottom.

This type of bag is typically used by placing the food product in the bag, evacuating the bag, gathering and applying a metal clip around the gathered mouth of the bag to form a hermetic seal, and then immersing the bag in a hot water bath at approximately the same temperature at which the film was stretch-oriented, typically about 71° to 96° C., hot water immersion being one of the quickest and most economical means of transferring sufficient heat to the film to shrink it uniformly. Alternatively, the bag may serve as a liner of a cooking mold. One problem which has been encountered is the failure of the bag seals at the bottom of the bags, when the bag is subjected to a temperature of 70° C. or higher for substantial periods of time, such as experienced during a cooking or pasteurization process.

U.S. Pat. No. 4,352,702 (issued Oct. 5. 1982 to Bornstein) covers a pasteurizable shrink bag from tubular film having a layer of hydrolyzed ethylene-vinyl acetate copolymer and an interior surface layer of a polyolefin which is cross-linkable by ionizing radiation, in with the layers being directly melt-joined without an adhesive disposed therebetween and the film being irradiatively cross-linked and oriented. A second irradiation treatment is carried out on receptacles made from the film to condition their heat seals for pasteurizing conditions.

U.S. Pat. No. 4,064,296 (issued Dec. 20, 1977 to Bornstein et al.) is directed to a coextruded tubular film having a layer of a hydrolyzed ethylene-vinyl acetate copolymer layer between two other polymeric layers at least one of which being irradiatively cross-linkable, the film being irradiated and oriented.

U.S. Pat. No. 3,595,740 (issued Jul. 27, 1971 to Gerow) discloses oxygen barrier films having an interior barrier layer of a melt extrudable hydrolyzed ethylene-vinyl acetate copolymer and a heat sealing layer of an ethylene polymer or copolymer.

U.S. Pat. No. 4,469,742 (issued Sep. 4, 1984 to Oberle et al.) discloses a pasteurizable, cook-in shrink film comprising a first or sealing layer, preferably made of an ionomer characterized as a metal salt neutralized copolymer of ethylene and acrylic acid or methacrylic acid; a second or shrink layer, a third or adhesive layer, a fourth or barrier layer, a fifth or adhesive layer and a sixth or abuse layer, wherein all of said layers are radiatively cross-linked to an extent corresponding to an irradiation dosage sufficient to increase the resistance of the film layers to delamination under cook-in or pasteurizing conditions but which permits the first layer to function as a sealing layer. The sealing layer being preferably made of an ionomer characterized as a metal salt neutralized copolymer of ethylene and acrylic acid or methacrylic acid.

U.S. Pat. No. 4,888,223 (issued Dec. 19, 1989 to Sugimoto et al.) discloses a food-packaging material comprising a heat-shrinkable, gas-barrier, multilayer plastic film laminate in the form of a seamless tube, wherein the innermost, food-contacting surface has an increased wet tension strength obtained by subjecting said surface to a Corona discharge.

JP-A-02184437-A describes a multi-ply film for packaging of raw and processed meat comprising an innermost layer which is made of a polyolefin resin containing as an essential ingredient an ethylene-ethyl acrylate-maleic anhydride copolymer.

U.S. Pat. No. 4,411,919 (issued Oct. 25, 1983, to Thompson) discloses a meat adhering cook-in packaging comprising a flexible plastic container being substantially conformable to a selected meat product and having an inner meat product contacting surface of polymeric olefin having been subjected to an energetic radiation surface treatment in the presence of oxygen sufficient to cause said inner surface to adhere to the meat product during cook-in, said container having been formed from hot blown tubular film made of polyethylene, polypropylene or ethylene vinyl acetate copolymer.

GB-B-2 009 033 (issued Aug. 25, 1982, to Matsuoka et al.) describes synthetic resin films for meat packaging which is made either of an olefin resin or a vinylidene chloride resin containing substantially no functional groups, the inner surface of which is activated by means of a corona or glow discharge treatment to increase meat-adhesiveness capable of withstanding qualitative changes in the meaty surface.

U.S. Pat. No. 4,855,183 (issued Aug. 8, 1989, to Oberle) as well discloses a multiple-layer cook-in film comprising a food contact surface made of a polyamide and having been subjected to an energetic radiation surface treatment provided by a high energy electron treatment to an extent corresponding to a dosage of up to about 12 MR.

U.S. Pat. No. 4,606,922 (issued 1986 to Schirmer) relates to a method for enhancing yield of a cook-in package meat product that includes first providing an adhering cook-in container including a flexible thermoplastic envelope being substantially conformable to a contained meat product and having an inner meat-contacting surface of a selectively irradiated ionomer or a metal salt neutralized copolymer of ethylene and acrylic acid or methacrylic acid, then conforming the container about a selected meat product and cooking the package product, whereupon the inner surface of the envelope bonds to the meat product substantially to prevent cook-out of fluids. Representatively, the ionomer of the inner binding surface is Surlyn, and a typical casing or an envelope is of the structure nylon- 6/adhesive/Surlyn.

For pasteurizable and/or cook-in multilayer shrink films for use as packaging bags for food products, it is important that the innermost layer being in contact with the food product contacts the food product closely and adheres to it so that the purge or liquids exuding from the food product do not get between the meat surface and the bag wall to create an unsightly package appearance. Specifically for meat it is necessary to keep the juices and liquids within the meat so that the meat does not become dry and its weight is not diminished. On the other hand the surface of this layer being the sealing layer must provide a strong seal closing the bag into which the food product has been introduced.

The problem to be solved by the present invention therefore is the provision of a pasteurizable and/or cook-in multilayer shrink film specifically for the manufacture of bags for food products which provides close and superior adherence to the food product and at the same time an increased seal strength when heat sealing the inner surfaces of said film.

It has been found that this problem can be solved by using as the material for the innermost sealing layer of the multilayer shrink film an ethylene-butyl acrylatemaleic anhydride copolymer, which according to a preferred embodiment is subjected to a Corona treatment.

SUMMARY OF THE INVENTION

The present invention is directed to a pasteurizable and/or cook-in multilayer shrink film from which packaging bags can be made which maintain seal integrity, are delamination resistant and are heat shrinkable during pasteurizing and/or cooking of a contained food product at a sustained elevated temperature in water or steam, and exhibit a suitable degree of adhesion to the surface of the meat product.

Accordingly, there is provided a pasteurizable and/or cook-in multilayer shrink film, which is characterized in that the innermost sealing layer comprises an ethylene-butyl acrylate-maleic anhydride copolymer.

DESCRIPTION OF THE PREFERRED EMBODIMENTS

According to a preferred embodiment of the present invention the multi-layer shrink film comprises at least one shrink layer and said sealing layer, and more preferably furthermore an outer layer and at least one barrier layer. A most preferred embodiment thereof comprises an outer abuse shrink layer, an outer adhesive layer, a barrier layer, an inner adhesive layer, an inner shrink layer and said innermost sealing layers, all layers being melt-bonded to the corresponding adjacent layers.

A representative embodiment of the invention is a composite tubular film having the multilayer structure (inside) A/B/C/D/C/E (outside), wherein A is the innermost sealing layer comprising the ethylene-butyl acrylate-maleic anhydride copolymer. B is primarily a shrink layer. C primarily are adhesive layers, D is primarily a barrier layer and E is an outer abuse layer. A tubular film configuration is especially suited for bag making.

The seal material of layer A comprises the ethylene-butyl acrylate-maleic anhydride copolymer as defined above, which is relatively resistant to degradation in the presence of grease so that the seal integrity of bags made from the film is maintained during cook-in conditions and has a softening point greater than that of shrink layer B, so that during the heat shrinkage of a bag made from the film about a contained food product the bag seals are not softened. According to a preferred embodiment of the present invention the ethylene-butyl acrylate-maleic anhydride copolymer has a softening point greater than that of the following shrink layer and more preferably comprises 75 to 98% by weight of ethylene, 1 to 20% by weight of butyl acrylate and 1 to 5% by weight of maleic anhydride. According to a more preferred embodiment said ethylene-butyl acrylate-maleic anhydride copolymer comprises 86 to 96% by weight of ethylene, 2 to 10% by weight of butyl acrylate and 2 to 4% by weight of maleic anhydride.

The second layer B being a shrink layer, is melt bonded to the innermost sealing layer A and is composed of an ethylene homopolymer or copolymer, representatively an ethylene-vinyl acetate copolymer having a vinyl acetate content of about 12% or less by weight, preferably 5 to 12% by weight of vinyl acetate, or comprises a linear low density polyethylene. The term "shrink layer" is intended to refer to the shrink controlling layer that initiates compatible shrinkage of the overall multilayer structure. The relative thickness of the shrink layer is selected as being sufficient relative to that of the overall film thickness such that the shrink temperature of the shrink layer controls the shrinkage of the entire multilayer film, when oriented.

Barrier layer D is preferably composed of a hydrolyzed ethylene-vinyl acetate copolymer and more preferably an ethylene-vinyl alcohol copolymer preferably comprising 44% by weight of ethylene and 56% by weight of vinyl alcohol and, importantly, is not degraded during irradiative crosslinking of the tubular film.

Adhesive layers C are melt bonded adjacent to the barrier layer to provide delamination resistance of the barrier layer in the shrink film under pasteurizing or cook-in conditions. The adhesive is composed of a chemically modified polyethylene being irradiatively cross-linkable and having functional groups with a relatively strong affinity for the barrier material. More preferably, the adhesive layers comprise an ethylene polymer modified with vinyl acetate and anhydride functionalities.

The outer or abuse shrink layer E isolates the barrier layer from adverse moisture contact and is representatively an ethylene copolymer, preferably an ethylene-vinyl acetate copolymer having a vinyl acetate content of 12% or less by weight or is linear low density polyethylene. More preferably this layer comprises an ethylene-vinyl acetate copolymer having a vinyl acetate content of about 5 to 12% by weight, more preferably about 6.5% by weight.

All layers within the film are melt bonded to their respective adjacent layers by virtue of full coextrusion after which the entire multilayer film preferably is subjected to ionizing radiation treatment to crosslink the layers. Representatively, the film will have an overall thickness prior to orientation of about 360 to 600 μm, the innermost sealing layer A will have a thickness of about 80 to 130 μm, shrink layer B about 80 to 130 μm, adhesive layers C about 20 to 40 μm each, barrier layer D about 20 to 40 μm, and outer or abuse shrink layer E about 140 to 220 μm. After orientation the film will have an overall thickness of about 50 to 68 μm, the innermost sealing layer A will have a thickness of about 14 to 18 μm, shrink layer B about 11 to 15 μm, adhesive layers C about 3 to 5 μm each, barrier layer D about 3 to 5 μm, and outer or abuse shrink layer E about 19 to 25 μm.

According to a further preferred embodiment of the invention the food-contacting inner surface of said innermost sealing layer is Corona treated, because this treatment further improves the adhesion of the film to the food product to be packaged and the seal-strength of the sealed bag made from said shrink film.

The tubular film of the invention can be made by a process similar to that described in U.S. Pat. No. 4,469,742 (Oberle), cited above, further provided that the tubular film is fully coextruded, i.e. all layers are simultaneously coextruded, using the conventional blown bubble technique. After cooling, the coextruded tube is flattened and then guided through an ionizing radiation field, for example through the beam of an electron accelerator to receive a radiation dosage in the range of about 3–12 megarads (MR). Irradiation by electrons to cross-link the molecules of polymeric material is conventional in the art. Radiation dosages are referred to herein in terms of the radiation unit "rad", with one million rads or a megarad being designated as "MR". The degree of molecular cross-linking is expressed in terms of the radiation dosage that induces the cross-linking. In general, irradiation should be sufficient to cross-link the irradiatively cross-linkable layers of the film to increase strength of the shrink layer without substantially diminishing elongation properties, and to provide delamination resistance of the film during pasteurizing or cook-in conditions. The tubular film is then cooled and collapsed after which it is fed into a hot water tank having water at about 88°–96° C. to soften the film for orientation; then it passes through pinch rolls and is inflated into a bubble and stretched to a point where the film thickness is representatively 60 μm. Suitable thickness will range from about 25 to 120 μm with a stretch ratio of about 8–15:1, which will impart a shrink capacity of about 30–55% biaxial free shrinkage at 85° C. (by ASTM D2732). As the bubble emerges from the hot water tank it cools rapidly in the air and then is collapsed and rolled up into flattened tubing. It is from this tubing of this final oriented thickness that bags are made as discussed above.

Since the barrier layer of the hydrolyzed ethylene-vinyl acetate copolymer (EVOH) is not degraded during radiation treatment of the entire multilayer film, the film maybe fully or simultaneously coextruded. Full coextrusion is advantageous in that all layers of the multilayer film are directly melt joined for enhanced interlayer strength under pasteurizing or cook-in conditions.

In use, bags are made from the film of the invention in conventional manner, as discussed above, to form either end-seal or side-seal bags. Eventually, the bags are loaded with a food product, vacuumized and sealed, and subjected to pasteurizing or cook-in treatment in near boiling water. During this food treatment, bags maintain good seal integrity, do not delaminate, and heat shrink to form a neatly packaged pretreated food product.

The sealing layer used according to the present invention is composed of an ethylene-butyl acrylate-maleic anhydride random copolymer. The term "random" is used in the conventional sense to refer to a copolymer consisting of segments of at least two monomeric units of random lengths, including single molecules, arranged in random order. Radiation treatment causes cross-linking of the copolymer, without significally effecting its sealing range.

Such ethylene-butyl acrylate-maleic anhydride copolymers are commercially available. A preferred embodiment comprises copolymers based upon 91% by weight of ethylene, 5.5% by weight of butyl acrylate and 3.5% by weight of maleic anhydride having a melt index of 5 g/10 min, a melting point of 107° C., a Vicat temperature of 85° C., a tensile strength at break of 12 MPa, an elongation at break of 600% and a flexural modulus of 120 MPa.

The inner shrink layer is an ethylene homopolymer or copolymer such as linear low density polyethylene, ethylene-vinyl acetate copolymer, or ethylene-methylacrylate copolymer. Preferably, the shrink layer is composed of an ethylene-vinyl acetate copolymer (EVA) having a vinyl acetate content in a range of about 5–12%, with the orientation temperature generally decreasing and shrink capacity increasing as the vinyl acetate content is increased. However, the melt temperature of EVA tends to decrease as the vinyl acetate content increases so that a content of about 12% is limiting with a melting temperature of about 95° C. for pasteurizing applications. Irradiative cross-linking corresponding to a dosage of about 3–12 MR provides sufficient cross-linking in the shrink layer to enable production of the tubular film and orienting by the blown bubble technique at economic production rates.

The barrier layer is composed of hydrolyzed ethylene-vinyl acetate copolymer (EVOH), preferably hydrolyzed to at least about 50%, most preferably to greater than about 99%. The mole percent of vinyl acetate prior to hydrolysis should be at least about 29% since for lesser amounts the effectiveness of the hydrolyzed copolymer as a gas barrier is substantially diminished. It is further preferred that the EVOH copolymer have a melt flow being generally compatible with that of the other components of the multilayer film, preferably in the range of 3–20, more preferably in the range of about 3–10 (melt flow being determined generally in accordance with ASTM D 1238). The gas of main concern is oxygen and transmission is considered to be sufficiently low, i.e. the material is relatively gas impermeable, when the transmission rate is below 70 cm$^3$/m$^2$/mil thickness/24 hrs./atms, as measured according to the procedures of ASTM Method D-3985. The multilayer film of the present invention has a transmission rate below this value. EVOH is advantageously utilized in the film of the invention since irradiative treatment of the fully coextruded film does not degrade the barrier layer, as would be the case for a vinylidene chloride-vinyl chloride copolymer (saran) barrier. Most preferably, the barrier layer comprises an ethylene-vinyl alcohol copolymer containing 44% by weight of ethylene and 56% by weight of vinyl alcohol.

The adhesive interlayers melt bonded adjacent the barrier layer are composed generally of a chemically modified polyethylene being irradiatively cross-linkable and being chemically modified by the provision of functional groups having a strong affinity for the EVOH copolymer of the barrier layer and which will form a strong bond under the heat and pressure of coextrusion. Preferably, the adhesive is a maleic anhydride grafted ethylene vinyl acetate copolymer ("BYNEL" from DuPont de Nemours) or a maleic anhydride grafted ethylene-alpha-olefin copolymer. Another suitable adhesive is a low density polyethylene modified with maleic anhydride to provide the necessary adhesion.

The outer or abuse shrink layer is provided to isolate the EVOH barrier layer from moisture contact and thereby to prevent degradation in barrier properties. The abuse layer is composed preferably of an ethylene homopolymer or copolymer, generally similar to the material of the foregoing shrink layer. More preferably, the abuse layer is composed of ethylene-vinyl acetate copolymer having a vinyl acetate content of about 5 to 12% by weight, most preferably about 6.5% by weight. Alternatively, the outer abuse layer may be the same as the sealing layer, this configuration being appropriate for form/fill/seal packaging wherein heat sealing is done on overlapped edge portions of a sheet of film.

The films according to the present invention exhibit excellent resistance to delamination and while the present invention is not to be limited to any particular theory concerning this superior resistance to delamination, it is believed that by irradiating the fully coextruded structure some measure of cross-linking across the interfaces of the various layers occurs. When the layers have been melt joined in the coextrusion process, there is a measure of intermingling of the melts at the layer interfaces. Thus, it is theorized that molecules from one layer are cross-linked with those in an adjacent layer to some extent during irradiative treatment. Additionally, it is believed that cross-linking accounts for an increase in viscosity, the beneficial effect being realized upon the multilayer components being heated into their respective softening ranges.

Furthermore, because of the use of an ethylene-butyl acrylate maleic anhydride copolymer for the manufacture of the innermost sealing layer an increase of the adhesion to the food products be packaged and specifically a high protein adhesion is obtained.

Additionally, the preferred irradiation and corona treatment of the inner surface of the innermost sealing layer provides for a dramatic improvement of the thermal resistance of the treated multilayer structure and at the same time provides for an increased sealing strength. This is considered to be surprising, because normally a Corona treatment is expected to provide a negative effect on sealability and seal strength both at cold and hot conditions. Therefore, the subject matter of the present invention provides a product having unexpectedly improved properties specifically with respect to the thermal resistance, the adhesion of the film to the food to be packaged and the sealing strength obtained when sealing the films via the innermost sealing layer.

The resins or basic polymeric materials fed into the extruders to make the tubular film of the present invention are widely available and can be purchased from any of a number of suppliers, for example those identified in trade publications such as Modern Plastics Encyclopedia.

The Corona treatment referred to above is applied on the internal surface of the tubing by means of two couples of electrodes, one reversed versus the other in order to assure the same treatment level on the two sides of the tubing. The electrodes are connected to a high tension/high frequency generator preferably being operated at for example 15 kV and 20 kHz. The Corona treatment level of the internal surface of the innermost sealing layer should be at least 35 dynes/cm. Such level of Corona treatment can be achieved with the above equipment when moving the tubing with a linear speed from 50 to 100 m/min, this range being a function of the bag size to be manufactured.

The invention is described more in detail on the basis of the following examples and comparative example.

EXAMPLES AND COMPARATIVE EXAMPLE

In accordance with the disclosure of the present invention pasteurizable and/or cook-in multilayer shrink films have been manufactured by coextruding the six layers made of the materials referred to in the following Table 1.

TABLE 1

| Layers | innermost sealing layer | inner shrink layer | inner adhesive layer | barrier layer | outer adhesive layer | outer or abuse shrink layer |
|---|---|---|---|---|---|---|
| Comparative Example | Ethylene-methacrylic acid copolymer partly neutralized with Zn | EVA | modified EVA | EVOH | modified EVA | EVA |
| Example 1 | Ethylene-butyl acrylate-maleic anhydride copolymer (91/5.5/3.5) | EVA | modified EVA | EVOH | modified EVA | EVA |
| Example 2 | Ethylene-butyl acrylate-maleic anhydride copolymer (91.5/5.3/3.0) | EVA | modified EVA | EVOH | modified EVA | EVA |

Thereafter the melt is quenched to form a tape. This tape is electronically cross-linked and successively oriented to obtain a tubing. This tubing is internally Corona treated and converted into bags.

In the following Table 2 the physical properties of the films according to the comparative example and Examples 1 and 2 according to the present invention are summarized.

TABLE 2

| Properties | | | Comparative Example | | Example 1 | | Example 2 | |
|---|---|---|---|---|---|---|---|---|
| Partial Thickness (μm) | | | | | | | | |
| A | | | 14 | | 16 | | 15 | |
| B | | | 21 | | 13 | | 13 | |
| C | | | 4 | | 4 | | 4 | |
| D | | | 5 | | 3 | | 3 | |
| C | | | 5 | | 4 | | 4 | |
| B | | | 21 | | 22 | | 22 | |
| Total Thickness (μm) | | | 67 | | 61 | | 63 | |
| Modulus at 23° C. | kg/cm (actual) | L | 22.9 | | 10.0 | | 11.3 | |
| | | T | 26.3 | | 10.9 | | 10.4 | |
| | kg/cm² | L | 3627 | | 1816 | | 1757 | |
| | | T | 3756 | | 1624 | | 1724 | |
| Tensile Strength | kg/cm (actual) | L | 3.2* | | 2.6 | | 2.9 | |
| | | T | 3.8 | | 2.6 (const.) | | 2.9 | |
| | kg/cm² | L | 493* | | 470 | | 493 | |
| | | T | 529 | | 437 | | 516 | |
| Elongation % | | L | 156* | | 158 | | 166 | |
| | | T | 115 | | 140 | | 119 | |
| | | | L | T | L | T | L | T |
| Shrink % at | 75° C. | | 9 | 20 | 14 | 19 | 15 | 20 |
| | 80° C. | | 13 | 25 | 21 | 28 | 21 | 26 |
| | 85° C. | | 19 | 32 | 27 | 36 | 28 | 37 |
| | 90° C. | | 28 | 40 | 42 | 51 | 40 | 47 |
| | 95° C. | | 41 | 51 | 53 | 59 | 51 | 58 |
| Shrink Tension | kg/cm | | 0.08 | 0.16 | 0.09 | 0.11 | 0.08 | 0.11 |
| | kg/cm² | | 11.4 | 22.0 | 14.7 | 19.4 | 14.2 | 19.4 |
| Haze % | | | 9.5 | | 5.6 | | 7.7 | |
| Gloss (i = 60 degrees) gloss units | | | 98 | | 96 | | 85 | |

Remarks:?
(*)Breakage of layers D-C-B occurs before the total breakage

From the above Table 2 it can be taken that the shrink films according to the examples of the present invention provide a better free shrink performance than the shrink film according to the comparative example.

From the bags manufactured from the multilayer shrink films according to the Comparative Example and Examples 1 and 2 of the invention, bags of a size of 300×500 mm have been manufactured. The bags have been sealed and the seal strength has been measured by means of the "Parallel Plate Test" both for the untreated film and the film treated by means of a Corona treatment. In the "Parallel Plate Test" each bag was clamped in a fixture provided with a hose. The open mouth end of the bag was clamped around the hose. Air was pumped through the hose whereby the bag was inflated. The two sides of each bag were respectively restrained by two metal plates based about 10 cm apart. For each bag the pressure was increased via the hose at the rate of 1 inch of water pressure per second until the seal for that bag burst open at the inches of water pressure designated in Table 3 below.

Furthermore, the meat adhesion results of the bags obtained have been tested for the untreated and the Corona treated films. Finally, a Cooking Test has been carried out showing the temperature at which seal reopening occurs. The data obtained in these tests are summarized in the following Table 3, wherein the data with respect to the seal strength and the meat adhesion are shown relatively to the results obtained with the material of the Comparative Example, which—as far as the Relative Meat Adhesion Test is concerned—has been normalized to be 100.

The following test method has been developed to measure the degree of meat adhesion of various experimental or other products in comparison with an internal standard material (the comparative example of following Table 3).

A large piece of hairless pork skin ("pork rind") is washed with detergent, rinsed and dried. A series of strips of rind of 18 cm×15 cm is cut, aiming to be as uniform as possible. Each strip of pork rind is then wrapped around a piece of corrugated cardboard. These pieces of pork rind are then placed in contact with a piece of standard material on one side and an experimental material on the other side. The pork rind and adhering plastic film are then clamped between two thick aluminum plates and placed in a thermostatic cooking bath for 1.5 hours at 70° C.

At the end of the cooking cycle the whole assembly is cooled in cold water, and then the samples are removed from the cell.

The individual strips of packaging material are then peeled off the pork rind and the force required to do so is measured by dynamometer in each case, for each strip of rind, a comparative value for the peel force is measured in comparison with the standard material.

TABLE 3

| Property | | Seal Strength (inches of water pressure) | Relative Meat Adhesion | Cooking Test Temperature at which seal reopening occurs (°C.) |
|---|---|---|---|---|
| Comparative Example | untreated | 130 | 100 | 70 |
| Example 1 | untreated | 170 | 330 | 75 |
| Example 2 | untreated | 172 | 200 | 70 |
| Example 1 | Corona treated | 175 | 300 | 95 |
| Example 2 | Corona treated | 186 | 230 | 90 |

From the above Table 3 it can be seen that the bags obtained from the multi-layer shrink film according to the present invention provide a good thermal resistance, as measured by a cooking test, in which the temperature at which the seal is open is measured. Furthermore, the internal corona treated version of the invention film unexpectedly provides a significant improvement in the thermal resistance. The products of examples 1 and 2 in the corona treated version resist for 20° to 25° C. more than the non-treated product. This is contrary to previous experience well known to those skilled in the art, that sealability and/Or seal strength of polymer materials such as polyethylene or polypropylene is normally diminished by corona treatment.

It will also be noted from Table 3 that meat adhesion of these materials is not significantly affected by corona treatment, which may be an advantage in that too high meat adhesion may cause damage to the meat structure when the packaging material is removed from the meat product.

Although the present invention has been described in conjunction with preferred embodiments, it is to be understood that modifications and variations may be utilized without departing from the principles and scope of the invention, as those skilled in the art will readily understand.

We claim:

1. A pasteurizable or cook-in multilayer shrink film, comprising an outer sealing layer comprising ethylene-butyl acrylate-maleic anhydride copolymer, and an outer or abuse shrink layer.

2. The film according to claim 1, wherein the film further comprises at least one barrier layer.

3. The film according to claim 1 or 2, wherein the ethylene-butyl acrylate-maleic anhydride copolymer comprises 75 to 98% by weight of ethylene, 1 to 20 % by weight of butyl acrylate and 1 to 5 % by weight of maleic anhydride.

4. The film according to claim 3, wherein the ethylene-butyl acrylate-maleic anhydride copolymer comprises 86 to 96% by weight of ethylene, 2 to 10% by weight of butyl acrylate and 2 to 4% by weight of maleic anhydride.

5. The film according to claim 1, wherein the film has been irradiated with high energy electrons.

6. The film according to claim 1, wherein the food-contacting inner surface of said innermost sealing layer is corona treated.

7. The film according to claim 1, further comprising a first adhesive layer, a barrier layer, a second adhesive layer and an inner shrink layer, wherein all said layers are melt-bonded to adjacent layers of said film.

8. The film according to claim 7, wherein said shrink layers comprise a cross-linked ethylene copolymer, and wherein the thickness of said shrink layers is sufficient such that the shrink temperature of the entire multilayer film, when oriented, is substantially controlled by the shrink temperature of said shrink layers.

9. The film according to claim 8, wherein said shrink layers comprise an ethylene-vinyl acetate copolymer having a vinyl acetate content of up to about 12% by weight, or low density polyethylene.

10. The film according to claim 9, wherein said ethylene-vinyl acetate copolymer comprises 88 to 95% by weight of ethylene and 5 to 12% by weight of vinyl acetate.

11. The film according to claim 7, wherein said adhesive layers comprise a chemically modified cross-linked polyethylene and have functional groups with a relatively strong affinity for the adjacent layers.

12. The film according to claim 11, wherein said adhesive layers comprise an ethylene polymer modified with vinyl acetate and anhydride functionalities.

13. The film according to claim 11, wherein said adhesive layers comprise a graft copolymer of ethylene with vinyl acetate or an alpha-olefin and at least one unsaturated carboxylic acid anhydride, or a maleic anhydride modified low density polyethylene.

14. The film according to, claim 7, wherein said barrier layer comprises an ethylene-vinyl alcohol copolymer or a vinylidene chloride copolymer.

15. The film according to claim 1, wherein all of said layers of said film are irradiatively cross-linked to an extent corresponding to an irradiation dosage sufficient to increase the resistance of the film layers to delamination under cook-in or pasteurizing conditions but which permits the innermost sealing layer to function satisfactorily as a sealing layer.

16. The film according to claim 15, wherein said film is irradiatively cross-linked to an extent corresponding to a dosage of about 3–12 MR.

17. The film according to claim 16, wherein said film is irradiatively cross-linked to an extent corresponding to a dosage of about 6–8 MR.

18. The film according to claim 16, wherein said film is oriented.

19. The film according to claim 18, characterized in that said film is biaxially oriented to an extent corresponding to a biaxial free shrinkage at 85° C. of about 3 to 65%.

* * * * *